United States Patent [19]

Sugisawa et al.

[11] Patent Number: 4,703,149
[45] Date of Patent: Oct. 27, 1987

[54] CONTAINER HEATED BY MICROWAVE OVEN

[75] Inventors: Ko Sugisawa, Nara; Masanori Yamamoto, Kaizuka; Ryusuke Nakanaga, Takatsuki, all of Japan

[73] Assignee: House Food Industrial Company Limited, Higashiosaka, Japan

[21] Appl. No.: 804,540

[22] Filed: Dec. 4, 1985

[30] Foreign Application Priority Data

Dec. 10, 1984 [JP] Japan .................... 59-260190
Dec. 14, 1984 [JP] Japan .................... 59-263866
Dec. 14, 1984 [JP] Japan .................... 59-263867

[51] Int. Cl.⁴ .............................. H05B 6/80
[52] U.S. Cl. .................. 219/10.55 E; 219/10.55 F; 426/243; 99/DIG. 14
[58] Field of Search ........ 219/10.55 E, 10.55 F, 219/10.55 D; 426/234, 243, 107; 126/390; 99/DIG. 14, 451

[56] References Cited

U.S. PATENT DOCUMENTS

| | | | |
|---|---|---|---|
| 2,714,070 | 7/1955 | Welch | 219/10.55 E X |
| 3,985,990 | 10/1976 | Levinson | 219/10.55 E |
| 4,317,017 | 2/1982 | Bowen | 219/10.55 E |
| 4,416,906 | 11/1983 | Watkins | 219/10.55 E X |
| 4,439,656 | 3/1984 | Peleg | 219/10.55 E |
| 4,450,334 | 5/1984 | Bowen et al. | 219/10.55 E |
| 4,478,349 | 10/1984 | Haverland, Jr. et al. | 219/10.55 E X |
| 4,486,640 | 12/1984 | Bowen et al. | 219/10.55 E |
| 4,495,392 | 1/1985 | Derby | 219/10.55 F X |
| 4,499,356 | 2/1985 | Hatagawa | 219/10.55 E |

FOREIGN PATENT DOCUMENTS

| | | |
|---|---|---|
| 51-2367 | 1/1976 | Japan . |
| 54-126743 | 10/1979 | Japan . |
| 56-32261 | 4/1981 | Japan . |
| 58-189795 | 12/1983 | Japan . |

Primary Examiner—Philip H. Leung
Attorney, Agent, or Firm—Oblon, Fisher, Spivak, McClelland & Maier

[57] ABSTRACT

This invention provides a container for use in heating by a microwave oven, which is capable of preventing locally occurring over-heating, and of allowing its contents to be uniformly and effectively heated. Referring to FIG. 1, the container of the present invention comprises a container proper 13; a lig 16; and a microwave shielding layer 15, characterized in that the shielding layer 15 is disposed at least on the position 14, through the intermediary of an air layer, where the upper surface of a material 12 contacts the side surface of the container proper 13, i.e., is disposed on the portion 17 of the lid which ovehangs the side wall of the container proper 13.

17 Claims, 8 Drawing Figures

CONTAINER HEATED BY MICROWAVE OVEN

BACKGROUND OF THE INVENTION

1. Field of the Invention

The present invention relates to a container used in heating by a microwave oven which allows a material to be uniformly and effectively heated, while minimizing any sudden local boiling which may occur during the microwave heating in the microwave oven.

2. Description of the Prior Art

Microwave ovens are widely used in commercial and industrial fields as well as in homes for various purposes including heating and cooking foods, since, with the microwave oven, a container having a lower heat resistance can be used than those required for heating by a gas range or oven, the time required for heating is very short, the contents are not scorched, and operation is simple. Various types of instant foods have, therefore, been marketed which are capable of being reheated or cooked by a microwave oven.

When heating foods by a microwave oven, foods are placed in a metallic cavity within the oven, and are irradiated by microwaves applied from a wave outlet provided on the wall of the cavity. The generated microwaves are reflected by the metal on the wall of the cavity, and penetrate the food from all directions, thereby heating the food uniformly.

In this regard, practical heating by a microwave oven presents the following phenomena in which a food 2 packed in a container body 1 shaped as, for example, shown in FIG. 8 is heated by a microwave oven.

More specifically, a portion 3 at which the container 1 and the upper surface (liquid surface) of the food 2 make contact is irradiated by both microwaves a and b supplied from the roof and the sides of the oven, respectively, while the other portions of the food within the container 1 receive only the microwaves (a or b) supplied from either the roof or from the side of the oven. This causes the portion 3 where the container body 1 and the food 2 make contact to be excessively heated, generating boiling thereon. This at the same time strikingly delays heating of the other portions within the container body 1, particularly the lower portion of the container, thereby causing the food to be heated unevenly.

It has therefore been the practice to provide an aluminum foil covering on the external surface of the container over the portion where a food is excessively heated, thereby overcoming the above described problem. In this improvement, since the aluminum foil reflects microwaves when they hit the foil, the transmission of microwaves is prevented at this portion, causing the food of this portion to be heated slowly. Various other improvements utilizing this prior art have been considered. Japanese Utility Model Publication No. 2367/1976, for example, discloses a container for a Japanese dish known as "chawanmushi" in which a metallic film is provided either on the external surface or on the internal surface of a lid such as to reflect microwaves, and in which a resistant film is also provided on the bottom of the container for absorbing microwaves. Japanese Utility Model Public Disclosure No. 189795/1983 and Japanese Patent Public Disclosure No. 32261/1981 propose a food package having a microwave shielding member provided on the side surface of a package. The specification of Japanese Patent Public Disclosure No. 126743/1979 discloses coating the periphery of food with a metallic foil selected in accordance with the speed at which a food is to be heated.

In all of the above described methods, however, a large portion of a container or its contents is coated with a metal such as an aluminum foil or the like by bonding. Consequently, microwaves are shielded to a greater extent than is desirable, thereby producing large energy loss and delaying the process of heating the contents to a remarkable extent. Also, this often causes the portion of a food which is coated with a metal to remain unheated, thereby often creating uneven heating of the food. Further, the temperature of the edge of the aluminum foil used is abnormally raised due to induction heating, and the portion of a container which contacts this portion is thereby melted or burned.

SUMMARY OF THE INVENTION

Under such circumstances, the present inventors made various studies and found that the provision of a microwave shielding layer on a container with its contents is the most effective way of inhibiting local overheatiang and sudden local boiling, the microwave shielding layer being provided in such manner that it covers the region where the upper surface of the contents contacts the side surface of the container body. Furthermore, it was found that by at least employing such a microwave shielding layer in the above described manner sudden local boiling of the contents can be completely prevented, while minimizing energy loss and allowing the contents to be heated very effectively. The present inventors further found that, in a case described as above, heating efficiency can be further increased and the possibility of induction heating occurring in the shielding layer remarkably decreased, by interposing an air layer between the microwave shielding layer and the container proper, and that with this air layer, even if induction heating is generated, adverse effects on the contents and the container proper can be kept to a minimum.

It is, therefore, a primary object of the present invention to provide a container for use in heating by a microwave oven which is capable of preventing locally occurring over-heating, and of allowing its contents to be uniformly and effectively heated.

Another object of this invention is to provide an inexpensive container for use in effective heating by a microwave oven.

These and other objects of this invention will be clear from the following description.

In accordance with the present invention, there is provided a container for use in heating by a microwave oven comprising a microwave shielding layer which covers, through the intermediary of an air layer, at least the region of a container proper where the upper surface of its contents makes contacts with the side surface of the container proper.

DESCRIPTION OF THE PREFERRED EMBODIMENTS

Figure 1:
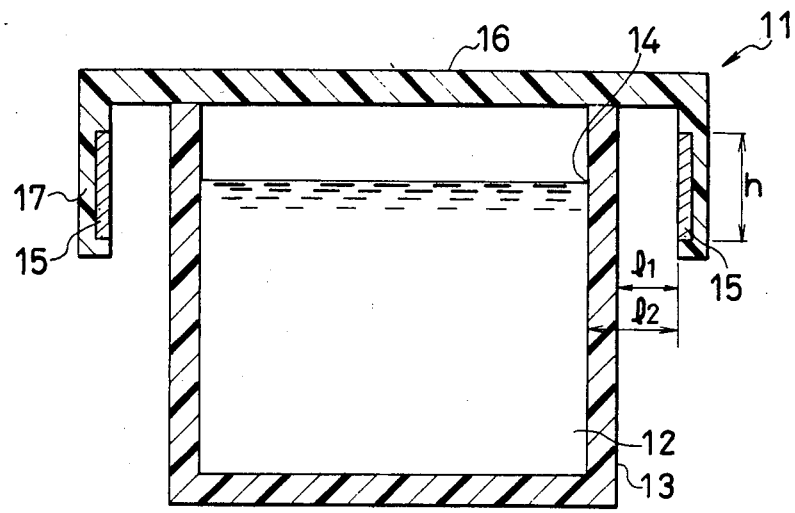
FIGS. 1 and 2 are sectional views of a container of the invention.

Containers of the invention may contain soup, adzukibean soup with rice cake, cooked food, various types of medical and pharmaceutical products, or the like. The container containing any of these products is made of a material which transmits microwaves and is sufficiently heat-resistant to withstand heating by a microwave oven (i.e. is not melted at least at 100° C.). Materials preferably employed as the material of the container include a polyethylene, a polypropylene, a polycarbonate, a polyester, a nylon and a paper coated with any of these polymers. The container may be filled with a product in advance and is then hermetically sealed by a lid integrally formed with the container, the lid being described hereinafter. The lid of the container may alternatively be formed such as to be removable so that the lid may be taken off and water poured over contents in a solid, granular, powdered, paste or other form which have been previously placed in the container prior to being cooked.

The microwave shielding layer may be formed of a metallic material which does not allow microwaves to penetrate such as aluminum, nickel, chromium, iron, zinc, tin or an alloy made from these metals. The microwave shielding layer is provided through the intermediary of an air layer by an appropriate means so as to cover at least the region where the upper surface of the contents make contact with the side surface of the container. Any means by which the microwave shielding layer can be disposed at the above described position may be employed as the means for providing the layer on the container body. The shielding layer, may for example, be provided at a predetermined position on the lid which covers the upper opening of the container.

Alternatively, the layer may be provided at a predetermined position on a container saucer laid under the container, on a ring wound around the container, or the like. In a case where the microwave shielding layer is provided on a lid, a saucer or a ring, a metallic thin film is bonded or laminated to such member. Such layer may be provided on these members by means of metal deposition, metal printing or the like. Alternatively, any of these members may be constituted by any of the above-mentioned metallic materials so as to thereby integrally form the required layer. In addition, the shielding layer may be provided either on the internal side or the external side of the lid or the like. It is preferable, however, with a view to heating every portion of the content uniformly, that the same is provided in such manner that it concentrically surrounds the container.

In a container according to the invention, the above-described microwave shielding layer is provided through the intermediary of an air layer at a position of the container where the layer covers at least the region where the upper surface of the contents make contact with the side surface of the container body. The contact area where the upper surface of the contents meets the side surface of the container body denotes a region where the upper surface of the contents contacts the side surface of the container at the time when the contents are heated by a microwave oven. The microwave shielding layer has a height sufficient to permit it to cover the above-described region, that is, for example, 4 mm or longer. With the microwave shielding layer provided as described above, sudden local boiling of the contents can be prevented, and enough microwaves can still simultaneously be supplied such as to further raise the temperature of the contents and to heat it effectively. More particularly, if the height of the microwave shielding material is set between 8 and 65 mm, a high degree of heating efficiency is achieved, while the overall effect of prevention of sudden local boiling can also be heightened. More preferably, the microwave shielding layer is disposed in such manner that the region from the upper edge of the container body to 5-95%, preferably 20-70% of the height of the container body is covered as described below, through the intermediary of an air layer, by the shielding layer.

The layer of air provided between the microwave shielding layer and the container body is provided in such manner that, for example, the horizontal length (l) between the contact area where the surface of the contents meets the side surface of the container and the microwave shielding layer is 0.5 mm or longer, preferably, 1.5 mm or longer, and more preferably, between 2.5 to 20 mm. With the air layer provided in the above described manner, heating efficiency can be further increased, in addition to the foregoing effects, and the time required for heating the contents can be further shortened. Moreover, since the heat energy of microwaves can be effectively utilized for dielectric heating, induction heating generated in the microwave shielding layer can be remarkably reduced. Even if such induction heating occurs, the air layer absorbs the heat energy, preventing any adverse effects on the contents of the container itself. Sudden local boiling can be prevented most effectively and the heating efficiency is most effectively increased when the horizontal length including the thicknesses of the air layer and the container body, or the horizontal length including these thicknesses and the thickness of a microwave penetrating material provided between the microwave shielding layer and the air layer, is set between 1.8 and 20.5 mm. It is also to be noted that as the length of the air layer relative to the above described length becomes greater, the effect of any induction heating on the contents or food can be more effectively prevented.

In the present invention, a double container can also be employed as the container proper. Examples of the double container include a double container which comprises an inner container for holding a material, an outer container positioned toward the outer side from the inner container, and a lid that covers the upper opening portion of said containers, a microwave shielding layer being disposed on the upper portion of the side wall of the outer container; another double container which comprises an inner container for holding a material, an outer container positioned toward the outer side from the inner container, and a lid that covers the upper opening portion of said containers and that has a side portion thereof which overhangs the outer container, a microwave shielding layer being disposed on the side portion of the lid; and the like. Where the double container described above is employed as the container proper, there can be prepared a container for use in heating by a microwave oven, which can be easily handled after heating and has excellent heat retaining properties. In this connection, it is more effective that the outer container be made of thermal insulating material such as polystyrene foam. It is also preferable that the horizontal length between the contact area where the surface of the contents meets the side surface of the inner container and the microwave shielding layer be set as described above. In addition, the microwave shielding layer is disposed in such manner that the region from the upper edge of the outer container to 5-95%, preferably 20-70% of the height of the outer container is covered as described above by the shielding layer.

Where the contents are boiled or steamed in the container of the present invention by a microwave oven, the lid of the container may be provided with an aperture so as to release the mounting pressure within the container when heated by a microwave oven, thereby preventing the sliding of the lid. It is preferable that the diameter of the aperture ranges from 0.7 to 3 mm, since a diameter of less than 0.7 mm can cause the aperture to be easily blocked. With an aperture having a diameter of more than 3 mm, effective steaming cannot be expected after the heating is completed. The aperture may be covered with a sheet which is attached with an adhesive having a suitable adhesive force which allows the sheet to be peeled off only when the pressure inside the container has increased. Alternatively, the aperture may be closed by a thin and easily breakable film such as a polyethylene which is adhered either on the upper surface or the underside of the lid. With the thus provided aperture, the inner pressure can be controlled, while hygienic requirements are fulfilled.

Additionally, the container may be provided on its inside with a mark indicating the desired level of the liquid contents after water is poured over solid or granular contents in the container before heating by a microwave oven.

The container of the invention may have a conical, cylindrical, cubic or other shape. It is preferable, however, that the container be formed with a shape having only curved surfaces and no sharp edges with a view to the prevention of over-heating of the contents. The container of the invention is easily manufactured by means of vacuum forming, compression molding, injection molding, or any other known forming method. Where the container of the present invention is a double container, it is preferable that air layer be employed between side wall of the inner container and that of the outer container, and between the bottom of the inner container and that of the outer container by connecting the opening portion of those containers. Where the height between the bottom of the inner container and that of the outer container is not less than 2 mm, preferably 3 to 25 mm, heating from the bottom direction by microwaves increases so that convection is effectively carried out, and therefore heating is more effectively conducted. In this connection, the height is preferably 3 to 15 mm where the microwave oven table is made of enameled ware or metal, and is also preferably 3 to 9 mm where the table is made of glass. On the other hand, if desired, an opening can be employed in the bottom of the outer container.

Embodiments of the present invention will be described hereinunder with reference to the accompanying drawings.

In FIG. 1, which is a sectional view of a container of the invention, a container 11 contains a material 12 for heating, and has a microwave shielding layer 15 provided at a position remote from a position 14 where the upper surface of the material 12 contacts the side surface of the container body 13 through an air layer having a horizontal length of 0.5 mm or more ($l_1$). The microwave shielding layer 15 is provided on a part of a portion 17 which constitutes the edge of a lid 16 which overhangs the container body 13. It is preferable that the microwave shielding layer is provided on the side of the overhanging portion 17 which is closer to the container, since the container with the thus provided shielding layer does not become too hot to be taken out of a microwave oven after it was heated. Alternatively, the side portion 17 of the lid may be entirely made of a microwave shielding material. It is to be noted that the horizontal length $l_2$ including the thickness of the container proper is 1.8 mm or more, while the vertical length h of the microwave shielding material is 4 mm or more.

Figure 2:
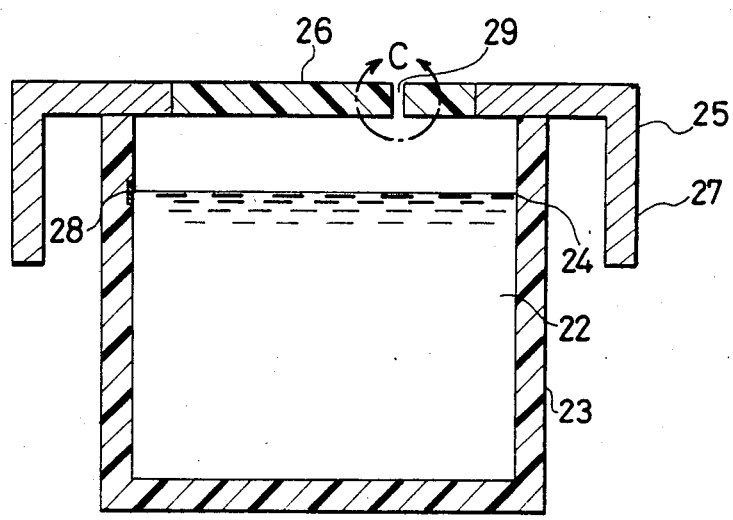

FIG. 2 is a sectional view of another embodiment of a container according to the invention. In the Figure, a microwave shielding layer 25 is constituted not only by the side portion 27 of the lid by also the edge portion of the upper surface of the lid 26. With this arrangement, it is possible for sudden local boiling to be prevented more effectively, since the microwaves coming from the roof of the oven are shielding away. Alternatively, not only the edge portion of the upper surface of the lid but also the entire upper surface may be covered by the shielding layer. The container is provided on its inner surface with a mark 28 indicating a position 24 where the upper surface of the contents are to finally contact the container body 23 for the convenience of pouring water over solid or powdered contents 22 by removing the lid 26 before the container is heated by microwave oven.

Further, an aperture 29 is provided in the upper surface of the container such as to prevent pressure from increasaing inside the container when the container is heated by a microwave oven.

Figure 3:
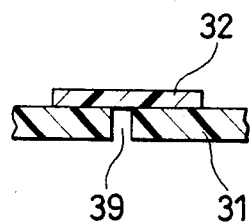
FIG. 3 is an enlarged sectional view showing another form of portion C shown in FIG. 2.

FIG. 3 is an enlarged sectional view showing another form of portion C shown in FIG. 2. In the Figure, an aperture 39 provided on a lid 31 of the container is shut by a member 32 which is bonded by an adhesive having such an adhesive force as to allow the member 32 to peel off when the pressure within the container is increased.

Figure 4:
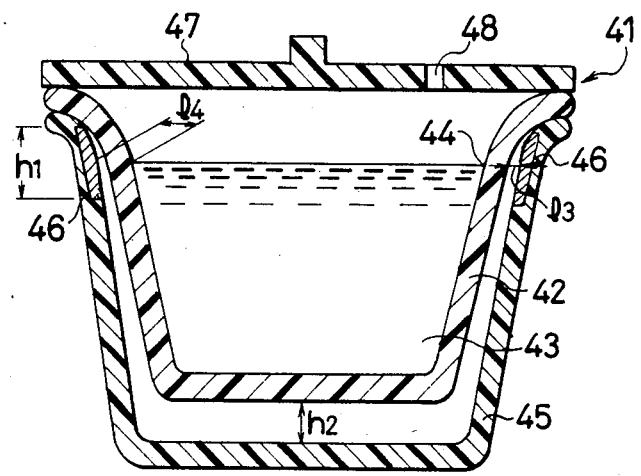
FIGS. 4 and 5 are sectional views of a double container of the invention.

In FIG. 4, which is a sectional view of a double container of the invention, an inner container 42 contains a material 43 for heating, and has a microwave shielding layer 46 provided at an upper portion of the side wall of the outer container 45 in such manner that the inner container 42 is surrounded with the shielding layer 46, the upper portion being remote from the position 44 where the upper surface of the material 43 contacts the side surface of the inner container 42 through an air layer having a horizontal length of 0.5 mm or more (l3). Referring to FIG. 4, it is preferable to provide the shielding layer 46 on inner surface of the side wall of the outer container 45 since the container will not feel hot when it is taken out from the microwave oven after heating. However, if desired, the shielding layer 46 can be provided on the outer surface of the side wall of the outer container 45. In the double container shown in FIG. 4, the horizontal length (l4) including the thickness of the container body is 1.8 mm or more, while the vertical length $h_1$ of the microwave shielding material is 4 mm or more. In addition, an aperture 48 is provided on a lid 47 of the container for escape of vapor, and the height ($h_2$) between the bottom of the inner container 42 and that of the outer container 45 is 2 mm or more.

Figure 5:
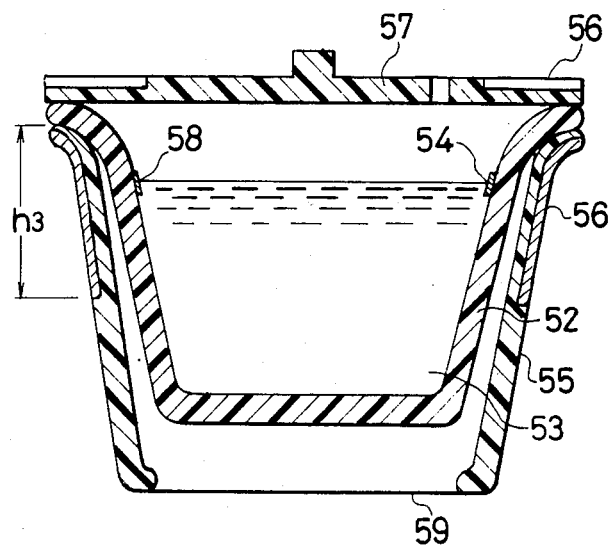

FIG. 5 is a sectional view of another double container of the invention. In the Figure, a microwave shielding layer 56 is constituted not only by the outer surface of the side wall of the outer container 55 but also by the edge portion of the upper surface of the lid 57. With this arrangement, it is possible for sudden local boiling to be prevented more effectively, since the microwave coming from the roof of the oven are shut out. Alternatively, not only the edge portion of the upper surface of the lid but also the entire upper surface may be covered by the shielding layer. The container is provided on its inner surface of the inner container 52 with a mark 58 indicating a position 54 where the upper surface of the contents are to finally contact the inner container 52 for the convenience of pouring water over solid or powdered contents by removing the lid 57 before the container is heated by a microwave oven. The bottom 59 of the outer container 55 is also openable. The vertical length ($h_3$) of the microwave shielding layer 56 is about half of the height of the outer container 55.

Figure 6:
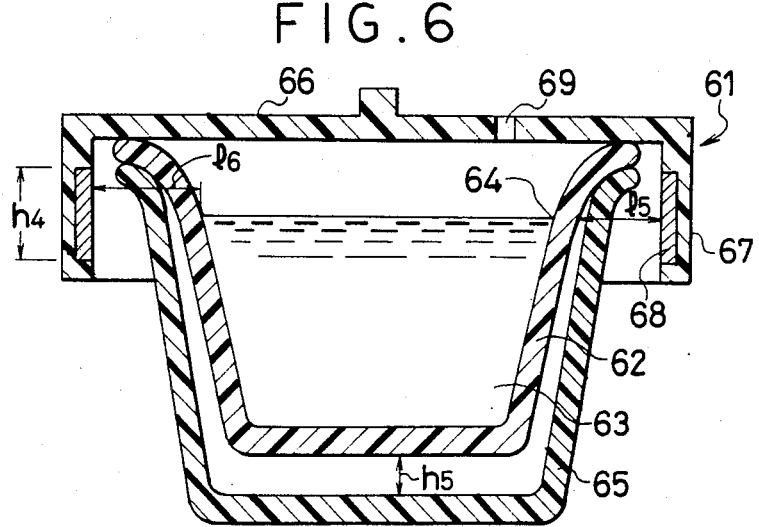
FIGS. 6 and 7 are sectional views of another double container of the invention.

In FIG. 6, which is a sectional view of another double container of the invention, an inner container 62 contains a material 63 for heating, and has a microwave shielding layer 68 provided at a side portion 67 of the lid 66 which overhangs the side wall of the outer container 65, in such manner that the inner container 62 is surrounded with the shielding layer 68, the side portion 67 being remote from the position 64 where the upper surface of the material 63 contacts the side surface of the inner container 62 through an air layer having a horizontal length ($l_5$) of 0.5 mm or more except for the thickness of the side wall of the outer container 65. Referring to FIG. 6, it is preferably to provide the shielding layer 68 on the inner surface of the side portion 67 since the container will not feel hot when it is taken out from the microwave oven after heating. However, if desired, the shielding layer 68 can be provided on the outer surface of the side portion 67.

In the double container shown in FIG. 6, the horizontal length ($l_6$) including the thickness of the container body is 1.8 mm or more, while the vertical length ($h_4$) of the microwave shielding material is 4 mm or more. In addition, an aperture 69 is provided on a lid 66 of the container for escape of vapor, and the height ($H_5$) between the bottom of the inner container 62 and that of the outer container 65 is 2 mm or more.

Figure 7:
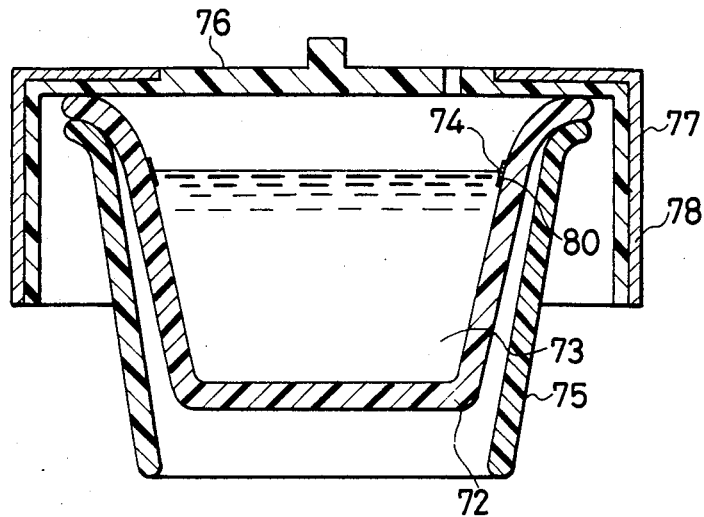
Figure 8:
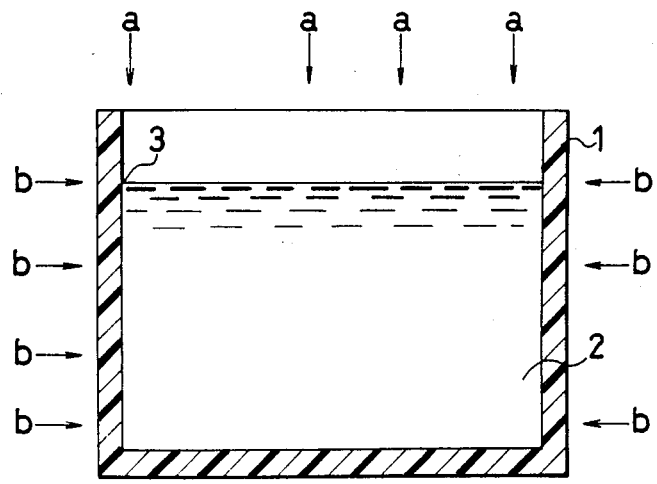
FIG. 8 is a sectional view of a known container.

FIG. 7 is a sectional view of another double container of the invention similar to the container shown in FIG. 5, wherein 72 denotes an inner container, 73 a material to be heating, 74 contact, 75 an outer container, 76 a lid, 77 a side portion of the lid, 78 a microwave shielding layer, and 80 a mark.

As described above, local heating of the contents can be prevented by use of a container according to the present invention, and effective and uniform heating can thus be realized in a short time when the contents are heated by a microwave oven. Further, since the container is for use in a microwave oven, the form thereof can be simplified, allowing it to be specifically used as a container for instant foods such as a soup, or adzuki-bean soup with rice cake.

Since the microwave shielding layer is not provided on the side wall of the inner container, the shielding layer does not come off where the inner container holding the material is sterilized in a retort. As a result, in particular, it is preferable that the double container of the present invention be used as a container for retort food.

The container of the present invention, which is basically arranged as described above, can be modified in various ways within the scope of the invention.

What is claimed is:

1. A container for use in heating by a microwave oven, comprising:
    a container body for containing a material to be heated, said material having an upper surface at a prescribed level, said container body having a side wall, a bottom portion and an upper opening portion;
    a lid covering said upper opening portion, said lid having a portion which overhangs said container body; and
    a microwave shielding layer which is disposed on said portion in such a manner that said shielding layer concentrically surrounds said container body and that a portion of said side wall from an upper edge of said side wall of said container body to 5–95% of the height of said side wall is covered by said shielding layer, so as to cover a region of said side wall in the vicinity of said prescribed level by said shielding layer, said microwave shielding layer and said region being separated by an air layer having a horizontal length of at least 0.5 mm, wherein the container body and said lid, other than a portion of said lid having said shielding layer disposed thereon, are transparent to microwaves.

2. A container as set forth in claim 1 wherein the microwave shielding layer has a vertical length of not less than 4 mm.

3. A container as set forth in claim 1 wherein the microwave shielding layer has a vertical length ranging between 8 and 65 mm.

4. A container as set forth in claim 1 wherein said lid has at least one aperture.

5. The container as set forth in claim 1 including means for denoting the prescribed level on said container body.

6. A double container for use in heating by a microwave oven, comprising:
    an inner container for containing a material to be heated, with an upper surface at a prescribed level;
    an outer container positioned on an outer side of the inner container, wherein said inner and outer containers each have a side wall, a bottom portion and an upper opening portion;
    a lid covering the upper opening portion of said containers; and
    a microwave shielding layer disposed on the side wall of the outer container in such a manner that a portion of the side wall of said outer container from an upper edge of the side wall of the outer container to 5–95% of the height of the side wall of the outer container is covered by the shielding layer, so as to cover a region of the side wall of the inner container in the vicinity of said prescribed level by said shielding layer, said microwave shielding layer and said region being separated by an air layer having a horizontal length of at least 0.5 mm, wherein the lid, the inner container and the outer container, except for a portion having said shielding layer disposed thereon, are made of a material which transmits microwaves.

7. A double container as set forth in claim 6 wherein the microwave shielding layer is disposed on an inner surface of the side wall of said outer container.

8. A double container as set forth in claim 6 wherein an air space of at least 2 mm is present between said bottom of the inner container and said bottom of the outer container.

9. A double container as set forth in claim 6 wherein the lid has at least one aperture.

10. A container as set forth in claim 6 wherein the microwave shielding layer is also provided on an edge portion of an upper surface of the lid.

11. The container as set forth in claim 6 including means for denoting the prescribed level on said inner container.

12. A double container for use in heating by a microwave oven, comprising:
- an inner container for containing a material to be heated, with an upper surface at a prescribed level;
- an outer container positioned on an outer side of the inner container, wherein said inner and outer containers each have a side wall, a bottom portion and an upper opening portion;
- a lid covering an upper opening portion of said containers, said lid having a side portion which overhangs the outer container; and
- a microwave shielding layer disposed on said overhang portion of the lid in such a manner that said shielding layer concentrically surrounds said outer layer and that a part of said outer container from an upper edge of the side wall of said outer container to 5-95% of the height of said side wall of said outer container is covered by said shielding layer so as to cover a region of the side wall of the inner container in the vicinity of said prescribed level by said shielding layer, said region and said microwave shielding layer being separated by an air layer having a horizontal length of at least 0.5 mm, wherein said inner and outer containers and said lid, except for a portion having said shielding layer disposed thereon, are made of a material which transmits microwaves.

13. A double container as set forth in claim 12 including a microwave shielding layer on an upper edge portion of an upper surface of said lid.

14. A double container as set forth in claim 12 including an air space of at least 2 mm betweeen a bottom of the inner container and a bottom of the outer container.

15. A double container as set forth in claim 12 wherein the lid has at least one aperture.

16. A container as set forth in claim 12, wherein the microwave shielding layer is also provided on an edge portion of an upper surface of the lid.

17. The container as set forth in claim 12 including means for denoting the prescribed level on said inner container.

* * * * *